US010793282B2

(12) United States Patent
VanDeMark et al.

(10) Patent No.: US 10,793,282 B2
(45) Date of Patent: Oct. 6, 2020

(54) LINER ASSEMBLY, ENGINE HOUSING, AND METHODS OF ASSEMBLING THE SAME

(71) Applicant: The Boeing Company, Chicago, IL (US)

(72) Inventors: Zachariah Beach VanDeMark, Snohomish, WA (US); Leonard J. Hebert, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 65 days.

(21) Appl. No.: 15/882,127

(22) Filed: Jan. 29, 2018

(65) Prior Publication Data
US 2018/0162542 A1    Jun. 14, 2018

Related U.S. Application Data

(63) Continuation-in-part of application No. 15/222,330, filed on Jul. 28, 2016, now abandoned.

(51) Int. Cl.
*B32B 3/12* (2006.01)
*B64D 29/00* (2006.01)
(Continued)

(52) U.S. Cl.
CPC ............... *B64D 29/00* (2013.01); *B32B 3/12* (2013.01); *B32B 3/30* (2013.01); *B32B 15/08* (2013.01); *B32B 15/20* (2013.01); *B64D 33/02* (2013.01); *F02C 7/045* (2013.01); *G10K 11/172* (2013.01); *B32B 2605/18* (2013.01); *B64D 2033/0206* (2013.01); *B64D 2033/0286* (2013.01);
(Continued)

(58) Field of Classification Search
CPC .......... F01D 25/24; F02C 7/045; F02K 1/827; B64D 29/00; F05D 2230/60; F05D 2250/283; F05D 2260/97; F04D 29/664; F04D 29/665
See application file for complete search history.

(56) References Cited

U.S. PATENT DOCUMENTS 3,806,928 A    4/1974  Costanza
3,820,628 A    6/1974  Hanson
(Continued)

FOREIGN PATENT DOCUMENTS

EP    0911803 A2    4/1999
EP    2017826 A2    1/2009
(Continued)

OTHER PUBLICATIONS

HexWeb Acousti-Cap product information, retrieved on Feb. 19, 2014 from website http://www.hexcel.com/Resources/DataSheets/Brochure-Data-Sheets/HexWeb_Acousti-Cap.pdf pp. 4.

*Primary Examiner* — Aaron R Eastman
*Assistant Examiner* — Theodore C Ribadeneyra
(74) *Attorney, Agent, or Firm* — Felix L. Fischer

(57) ABSTRACT

A liner assembly includes a core and a septum coupled to the core. The liner assembly also includes a facesheet coupled to the septum. The facesheet includes a plurality of slots defined therethrough. Each slot of the plurality of slots is substantially continuous over a selected portion of a surface and perpendicular to or parallel to a centerline of the liner assembly.

16 Claims, 14 Drawing Sheets

(51) Int. Cl.
  *B64D 33/02*     (2006.01)
  *B32B 3/30*      (2006.01)
  *B32B 15/08*     (2006.01)
  *B32B 15/20*     (2006.01)
  *F02C 7/045*     (2006.01)
  *G10K 11/172*    (2006.01)

(52) U.S. Cl.
  CPC .... *F05D 2220/323* (2013.01); *F05D 2230/60* (2013.01); *F05D 2250/312* (2013.01); *F05D 2250/313* (2013.01); *F05D 2260/96* (2013.01); *F05D 2260/963* (2013.01); *F05D 2260/97* (2013.01); *F05D 2300/514* (2013.01); *Y02T 50/672* (2013.01)

(56) References Cited

U.S. PATENT DOCUMENTS

| | | | |
|---|---|---|---|
| 3,977,492 A * | 8/1976 | Hankel | E04B 1/86 |
| | | | 181/292 |
| 4,539,244 A | 9/1985 | Beggs et al. | |
| 5,041,323 A | 5/1991 | Rose et al. | |
| 5,344,280 A | 9/1994 | Langenbrunner et al. | |
| 6,203,656 B1 | 3/2001 | Syed | |
| 6,268,038 B1 | 7/2001 | Porte et al. | |
| 6,379,110 B1 * | 4/2002 | McCormick | B64C 23/00 |
| | | | 415/115 |
| 6,536,556 B2 | 3/2003 | Porte et al. | |
| 6,607,625 B2 | 8/2003 | Andre et al. | |
| 6,615,950 B2 | 9/2003 | Porte et al. | |
| 6,688,558 B2 | 2/2004 | Breer et al. | |
| 6,749,704 B2 | 6/2004 | Boussu et al. | |
| 6,755,280 B2 | 6/2004 | Porte et al. | |
| 6,761,245 B2 | 7/2004 | Porte | |
| 6,772,857 B2 | 8/2004 | Porte et al. | |
| 6,820,337 B2 | 11/2004 | Buge et al. | |
| 6,827,180 B2 * | 12/2004 | Wilson | B32B 3/20 |
| | | | 181/292 |
| 6,840,349 B2 | 1/2005 | Andre et al. | |
| 6,896,099 B2 | 5/2005 | Porte et al. | |
| 6,923,931 B2 | 8/2005 | Dublineau et al. | |
| 7,257,894 B2 | 8/2007 | Buge et al. | |
| 7,338,696 B2 | 3/2008 | Rambaud et al. | |
| 7,484,592 B2 | 2/2009 | Porte et al. | |
| 7,503,425 B2 | 3/2009 | Strunk | |
| 7,790,082 B2 | 9/2010 | Buge et al. | |
| 7,857,093 B2 | 12/2010 | Sternberger et al. | |
| 7,921,966 B2 | 4/2011 | Chiou et al. | |
| 7,923,668 B2 | 4/2011 | Layland et al. | |
| 8,067,097 B2 | 11/2011 | Mueller | |
| 8,899,512 B2 | 12/2014 | Vauchel et al. | |
| 9,604,438 B2 | 3/2017 | Lumbab et al. | |
| 2002/0157764 A1 | 10/2002 | Andre et al. | |
| 2003/0021976 A1 | 1/2003 | Dublineau et al. | |
| 2003/0042657 A1 | 3/2003 | Dublineau et al. | |
| 2004/0023026 A1 | 2/2004 | Rambaud et al. | |
| 2004/0006577 A1 | 4/2004 | Buge et al. | |
| 2004/0148891 A1 | 8/2004 | Porte et al. | |
| 2004/0227276 A1 | 11/2004 | Buge et al. | |
| 2005/0081992 A1 | 4/2005 | Buge et al. | |
| 2008/0248278 A1 | 10/2008 | Fisher et al. | |
| 2010/0199629 A1 | 8/2010 | Chene et al. | |
| 2010/0301161 A1 * | 12/2010 | Chene | B64D 33/02 |
| | | | 244/1 N |
| 2011/0162429 A1 | 7/2011 | Leacock et al. | |
| 2011/0248117 A1 * | 10/2011 | Boock | B32B 3/12 |
| | | | 244/1 N |
| 2013/0126265 A1 | 5/2013 | Sternberger et al. | |
| 2015/0047921 A1 * | 2/2015 | Disimile | F04B 11/00 |
| | | | 181/264 |
| 2015/0315972 A1 * | 11/2015 | Lumbab | G10K 11/161 |
| | | | 415/119 |
| 2017/0001730 A1 * | 1/2017 | Namgoong | B64D 29/00 |

FOREIGN PATENT DOCUMENTS

| | | |
|---|---|---|
| GB | 1490923 | 11/1977 |
| WO | 2012116999 A1 | 9/2012 |

* cited by examiner

LINER ASSEMBLY, ENGINE HOUSING, AND METHODS OF ASSEMBLING THE SAME

REFERENCE TO RELATED APPLICATIONS

This application is a continuation-in-part of application Ser. No. 15/222,330 filed on Jul. 28, 2016 entitled DRAG REDUCING LINER ASSEMBLY AND METHODS OF ASSEMBLING THE SAME having a common assignee with the present application, the disclosure of which is incorporated herein by reference.

BACKGROUND

The field of the disclosure relates generally to reduction liner for use with a turbofan engine, and, more particularly, to a drag-reducing liner assembly and methods of assembling the same.

At least some known engines, such as some known jet engines and turbofan jet engines, are surrounded by a generally barrel-shaped nacelle and a core casing that covers the core engine. Such engines, and the airflow moving therethrough, generate an undesired amount of noise. As such, at least some known engines include an acoustic liner mounted on exposed surfaces of the engine, nacelle, and housing to dampen the noise level. More specifically, such acoustic liners include a honeycomb core coupled to a facesheet including a plurality of holes defined therethrough. In at least some known acoustic liners, the holes are either circular or elongated in the direction of the airflow. Sound waves generated inside the engine propagate and enter the cells of the honeycomb core through the facesheet and reflect from a backsheet at a phase different from the entering sound waves to facilitate damping the incoming sound waves and attenuating the overall noise level.

However, the air flowing over the holes defined in the facesheet cause an undesired amount of surface drag, which can reduce the efficiency of the engine. Additionally, the cost and time required to form the amount of holes in the facesheet required to achieve the desired acoustic performance is extensive.

BRIEF DESCRIPTION

In one aspect, a liner assembly is provided. The liner assembly includes a core and a septum coupled to the core. The liner assembly also includes a facesheet coupled to the septum. The facesheet includes a plurality of slots defined therethrough, the plurality of slots and intervening strips forming an array, wherein the array is continuous over a selected surface covered by the liner assembly.

In various aspects the array of slots in the liner assembly is oriented parallel to an airflow over the face sheet or perpendicular to the airflow over the face sheet.

In another aspect, an engine housing having a centerline and an axis extending through the engine housing parallel to the centerline is provided. The engine housing includes a nacelle including an inner surface and a core casing including an outer surface. The inner surface and the outer surface are configured to be exposed to an airflow traveling in a direction generally parallel to the axis. The engine housing also includes a liner assembly coupled to at least one of the inner surface and the outer surface. The liner assembly includes a core and a septum coupled to the core. The liner assembly also includes a facesheet coupled to the septum. The facesheet includes plurality of slots defined therethrough, with intervening strips forming an array, wherein the array is continuous over the inner surface covered by the liner assembly.

In various aspects, the plurality of slots in the array are oriented circumferentially with respect to the centerline or are oriented parallel to the airflow.

In another aspect, a method of assembling a liner assembly is provided. The method includes coupling a septum to a core and coupling a facesheet to the septum, wherein the facesheet includes a plurality of slots defined therethrough, and each slot of the plurality of slots is circumferentially substantially continuous and oriented perpendicular to a centerline of the liner assembly.

In another aspect, the method of assembling a liner assembly includes coupling a septum to a core and coupling a facesheet to the septum, wherein the facesheet includes a plurality of slots defined therethrough, and each slot of the plurality of slots is oriented parallel to a centerline of the liner assembly.

DETAILED DESCRIPTION

The implementations described herein provide an apparatus and method for noise attenuation and drag reduction in an engine housing. The implementations describe a liner assembly that includes a core, a septum coupled to the core, and a facesheet coupled to the septum. The facesheet includes a plurality of slots defined therethrough. Each slot may be elongated or substantially circumferentially continuous in a direction perpendicular to the direction of an airflow that is configured to travel over the facesheet. Alternatively, each slot may be parallel to the airflow. Furthermore, the septum is coupled to a top surface of the core such that the septum and the facesheet are in direct contact with one another. The implementations described herein provide improvements over at least some known noise attenuation systems for engine housings. As compared to at least some known noise attenuation systems, the implementations described herein facilitate reducing the drag induced by the slots during operation. More specifically, as described above, estimates and experimental testing have shown that orienting the slots either in a direction perpendicular to or parallel to the airflow direction can reduce drag. Furthermore, combining the slots with the position of the septum being directly adjacent the facesheet can further reduce the drag to unexpected levels comparable to that of a smooth facesheet having no slots or holes.

Figure 1A:
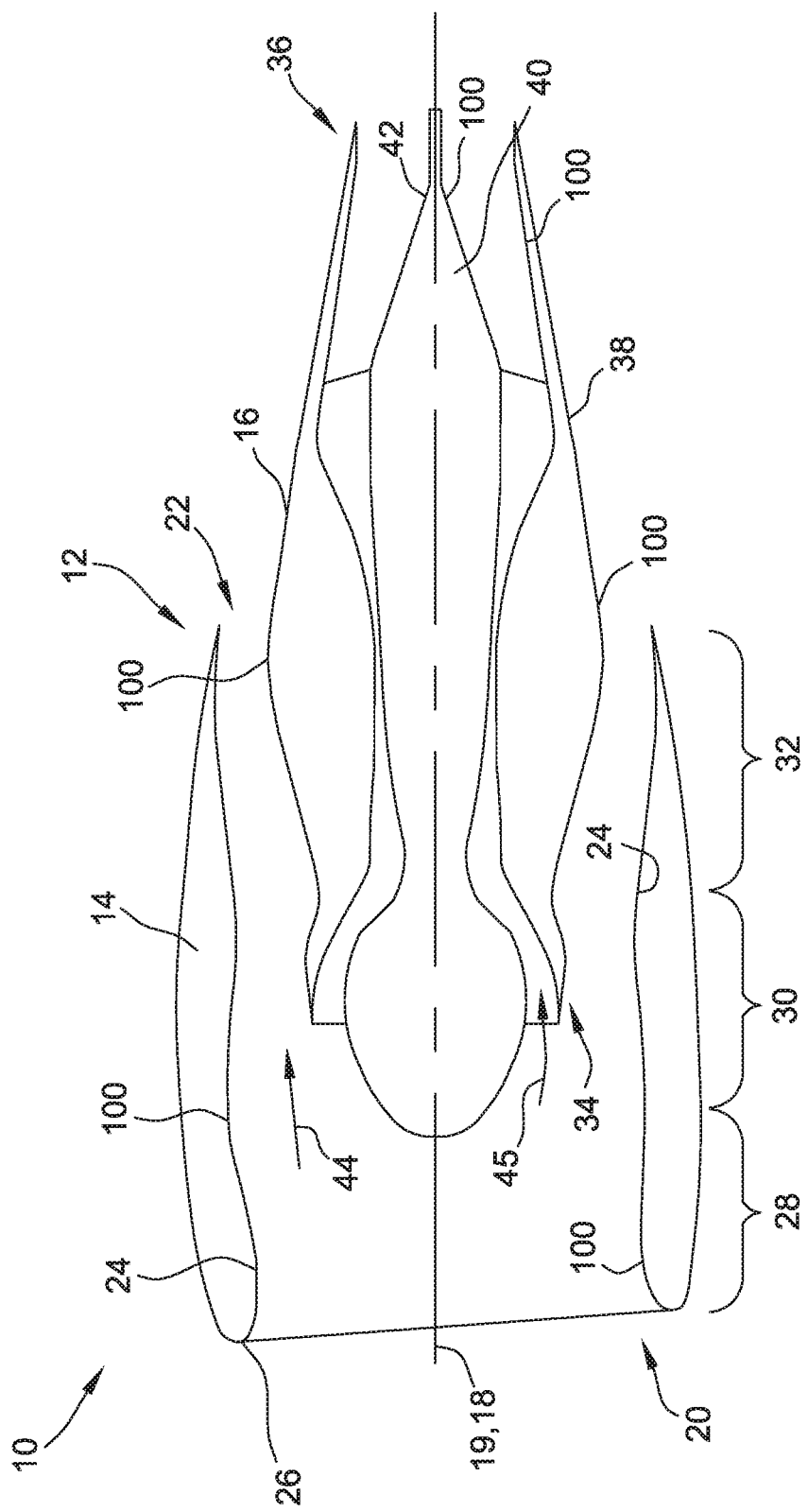
FIG. 1A is a schematic cross-sectional view of an embodiment of an engine assembly including an engine housing.

Referring more particularly to the drawings, implementations of the disclosure may be described in the context of an engine assembly 10 shown schematically in cross-section in FIG. 1A. The engine assembly 10 can be used with an aircraft engine. In an embodiment, engine assembly 10 includes a housing 12 including a nacelle 14 and a core casing 16. Nacelle 14 and core casing 16 enclose a turbofan engine for use with an aircraft. It should be understood, however, that the disclosure applies equally to nacelles and core casings for other types of engines, as well as to other structures subjected to noise-generating fluid flow in other applications, including but not limited to automobiles, heavy work vehicles, and other vehicles.

In the illustrated implementation, nacelle 14 and core casing 16 extend generally circumferentially about a centerline 18. Nacelle 14 includes a forward end 20, an aft end 22, and an inner surface 24 extending between ends 20 and 22. Nacelle 14 also includes, in a sequential forward to aft arrangement, a lip portion 26, an inlet portion 28, a fan case portion 30, and a fan duct portion 32. Inner surface 24 extends axially along each of lip portion 26, inlet portion 28, fan case portion 30, and fan duct portion 32. Similarly, core casing 16 includes a forward end 34, an aft end 36, and an outer surface 38 extending between ends 34 and 36. Core casing 16 also includes a nozzle portion 40 including an outer surface 42.

In the exemplary implementations, engine housing 12 includes a liner assembly 100 coupled to at least one of inner surface 24 of nacelle 14, outer surface 38 of core casing 16, and outer surface 42 of nozzle portion 40. During operation, liner assembly 100 is exposed to an airflow 44 traveling through housing 12 in the axial direction, that is, along an axis 19, which is parallel to centerline 18. As described herein, liner assembly 100 can both attenuate noise generated by engine assembly 10 and also reduce drag created by airflow 44 along inner surface 24 and outer surface 38 and by an airflow 45 through core casing 16 and along outer surface 42. In one implementation, liner assembly 100 is coupled along an entire length of inner surface 24 between ends 20 and 22 of nacelle 14 and is also coupled along an entire length of at least one of outer surface 38 between ends 34 and 36 of core casing 16. In another implementation, liner assembly 100 is coupled to only a portion of at least one of inner surface 24 and outer surface 38. Generally, liner assembly 100 extends along at least one of inner surface 24 and outer surface 38 any length required to achieve the desired noise attenuation and drag reduction.

Figure 1B:
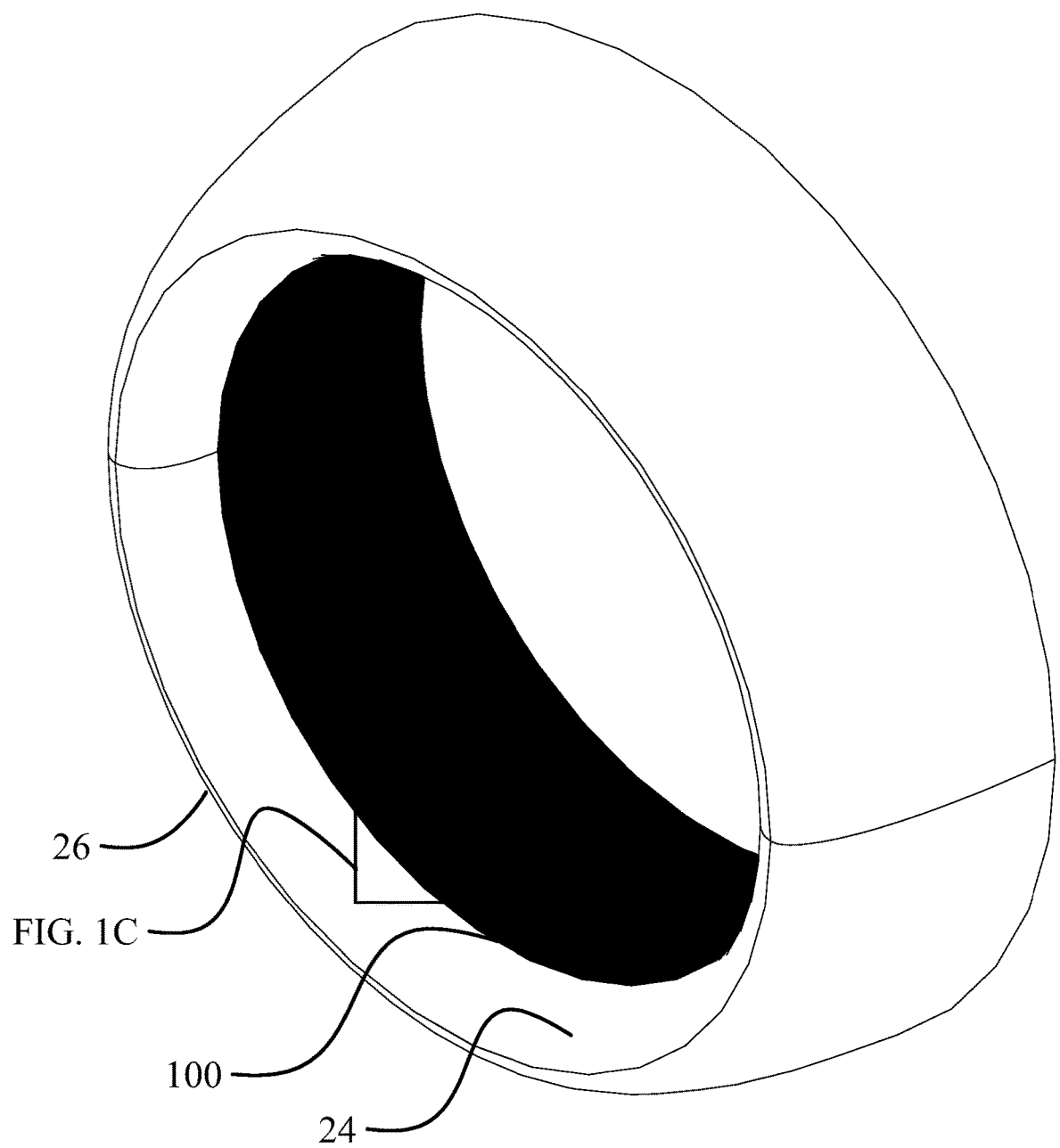
FIG. 1B is a pictorial partial view of a first implementation of the inlet portion of the engine housing with an exemplary liner assembly having slots oriented perpendicular to the centerline of the engine housing.
Figure 1C:
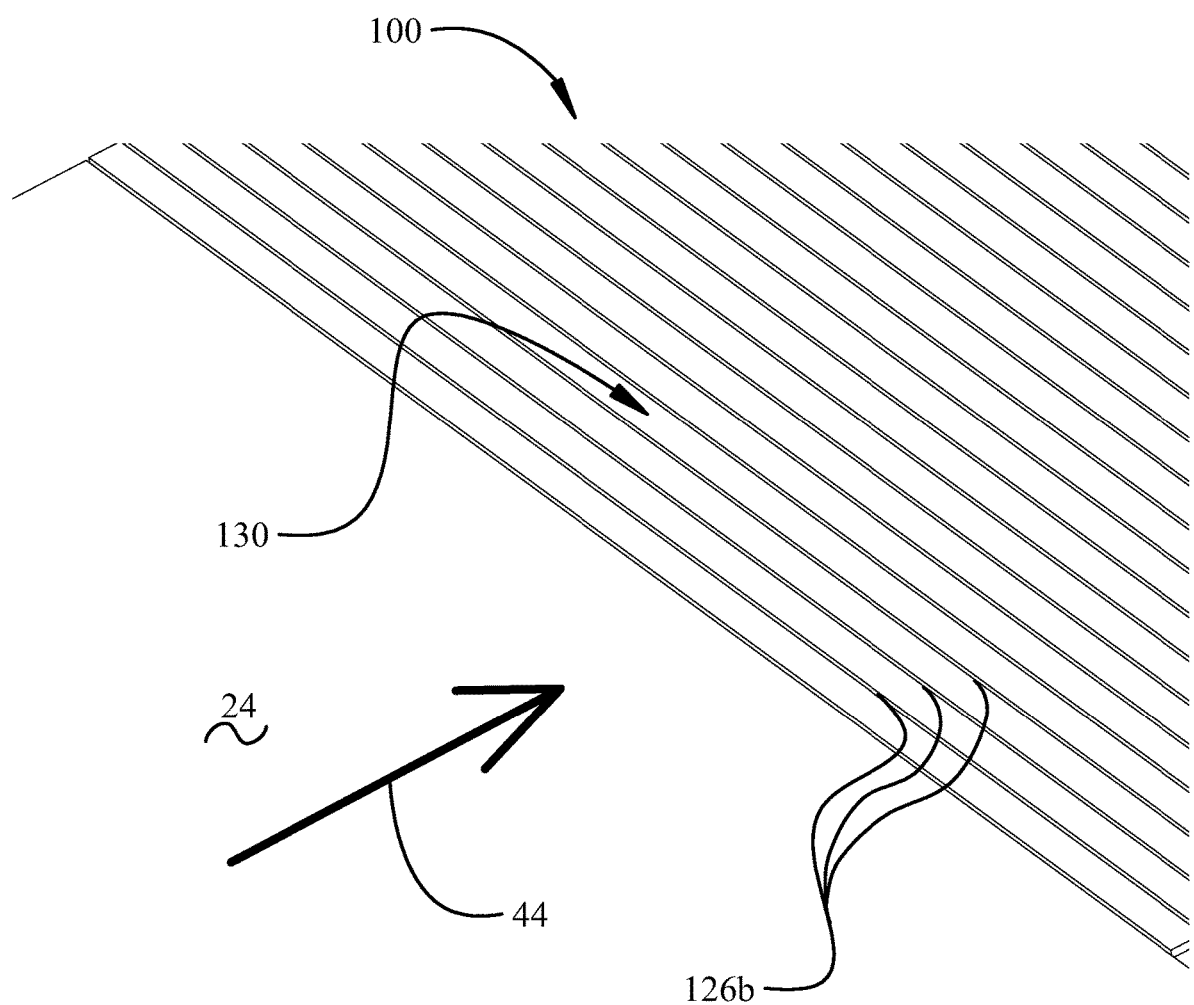
FIG. 1C is an enlarged view of a representative portion of FIG. 1B.

FIGS. 1B and 1C show a first exemplary implementation of the liner assembly 100 for the inner surface 24 of the inlet portion 28. Similar implementations for the other portions of the inner and outer surfaces may be employed. As seen in FIG. 1C, slots 126b in the liner 100, described in greater detail subsequently, are oriented perpendicular to the airflow 44.

Figure 1D:
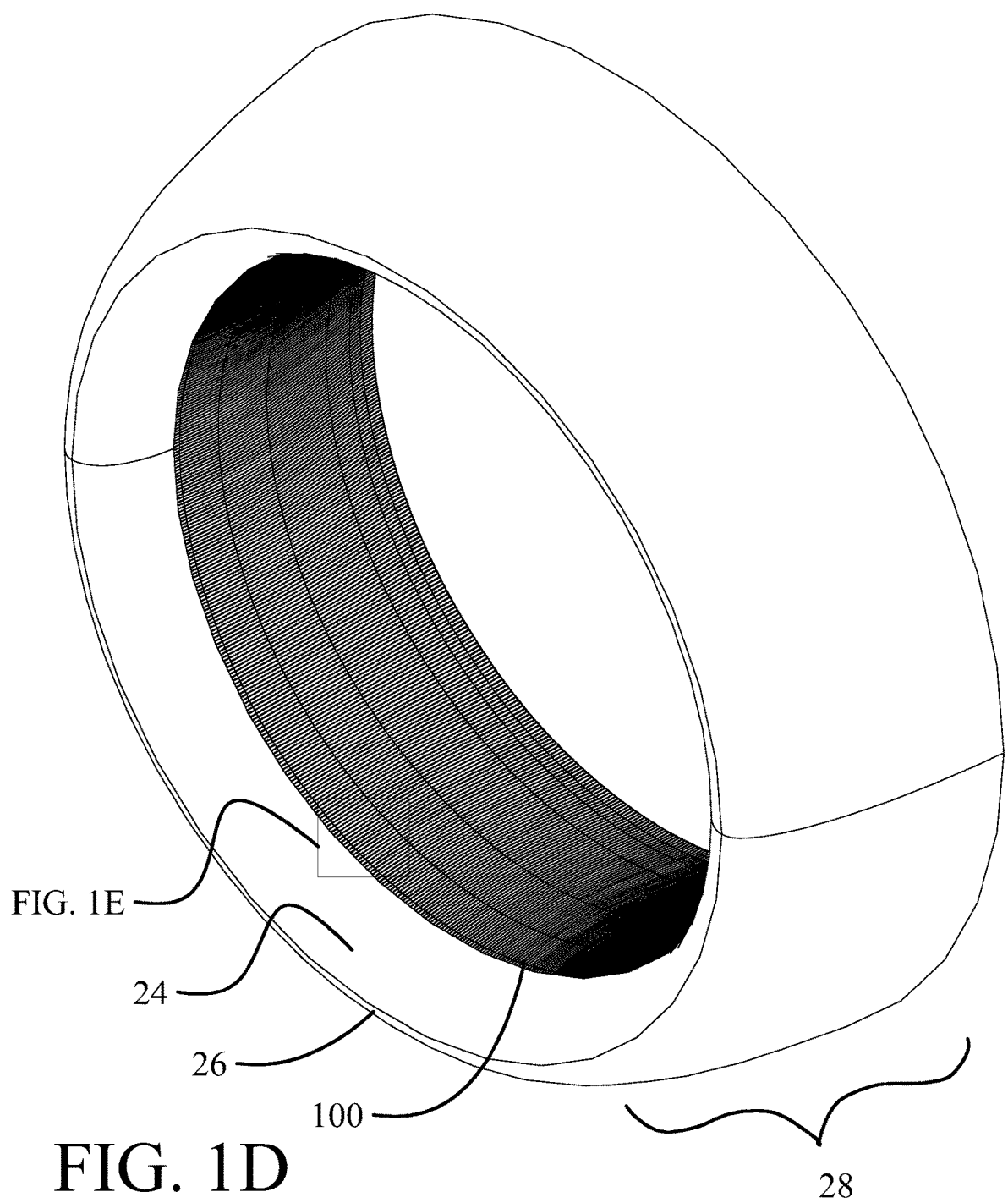
FIG. 1D is a pictorial partial view of a second implementation of the inlet portion of the engine housing with an exemplary liner assembly having slots oriented parallel to the centerline of the engine housing.
Figure 1E:
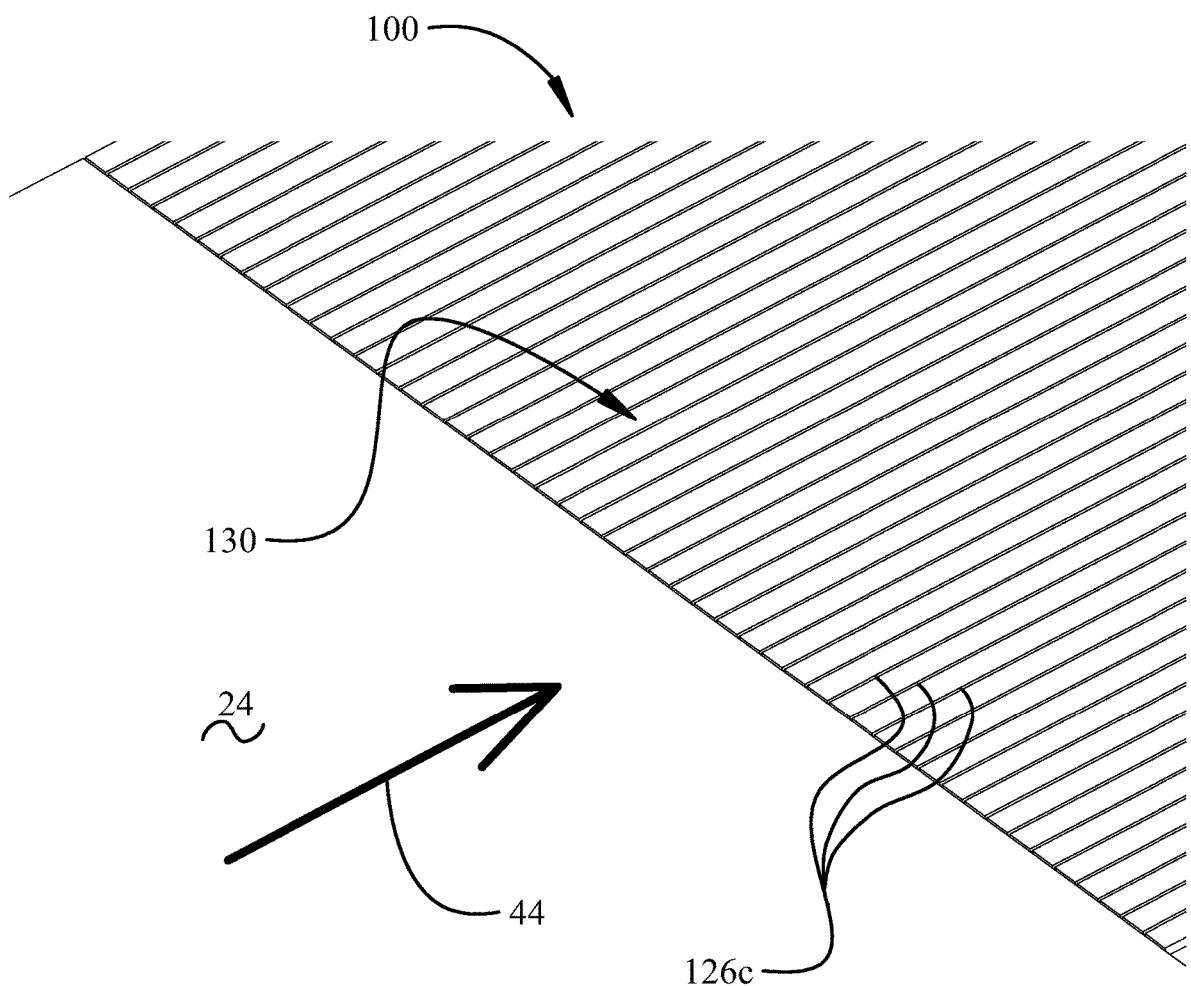
FIG. 1E is an enlarged view of a representative portion of FIG. 1D.

FIGS. 1D and 1E show a second exemplary implementation of the liner assembly 100 for the inner surface 24 of the inlet portion 28. Similar implementations for the other portions of the inner and outer surfaces may be employed. As seen in FIG. 1E, slots 126c in the liner 100, described in greater detail subsequently, are oriented parallel to the airflow 44.

Figure 2A:
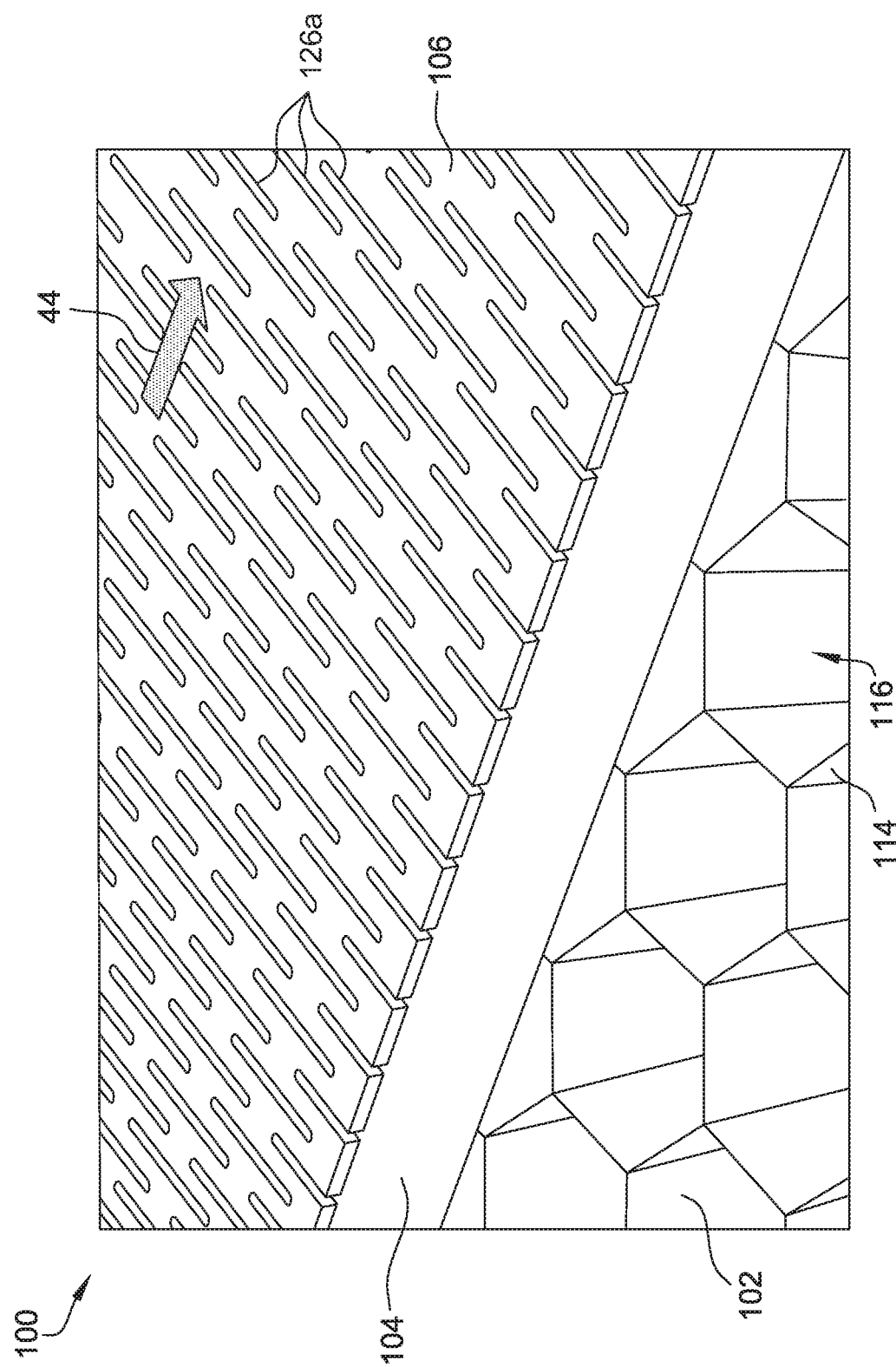
FIG. 2A is an exploded perspective view of the first implementation of the exemplary liner assembly that may be used with the engine housing.
Figure 2B:
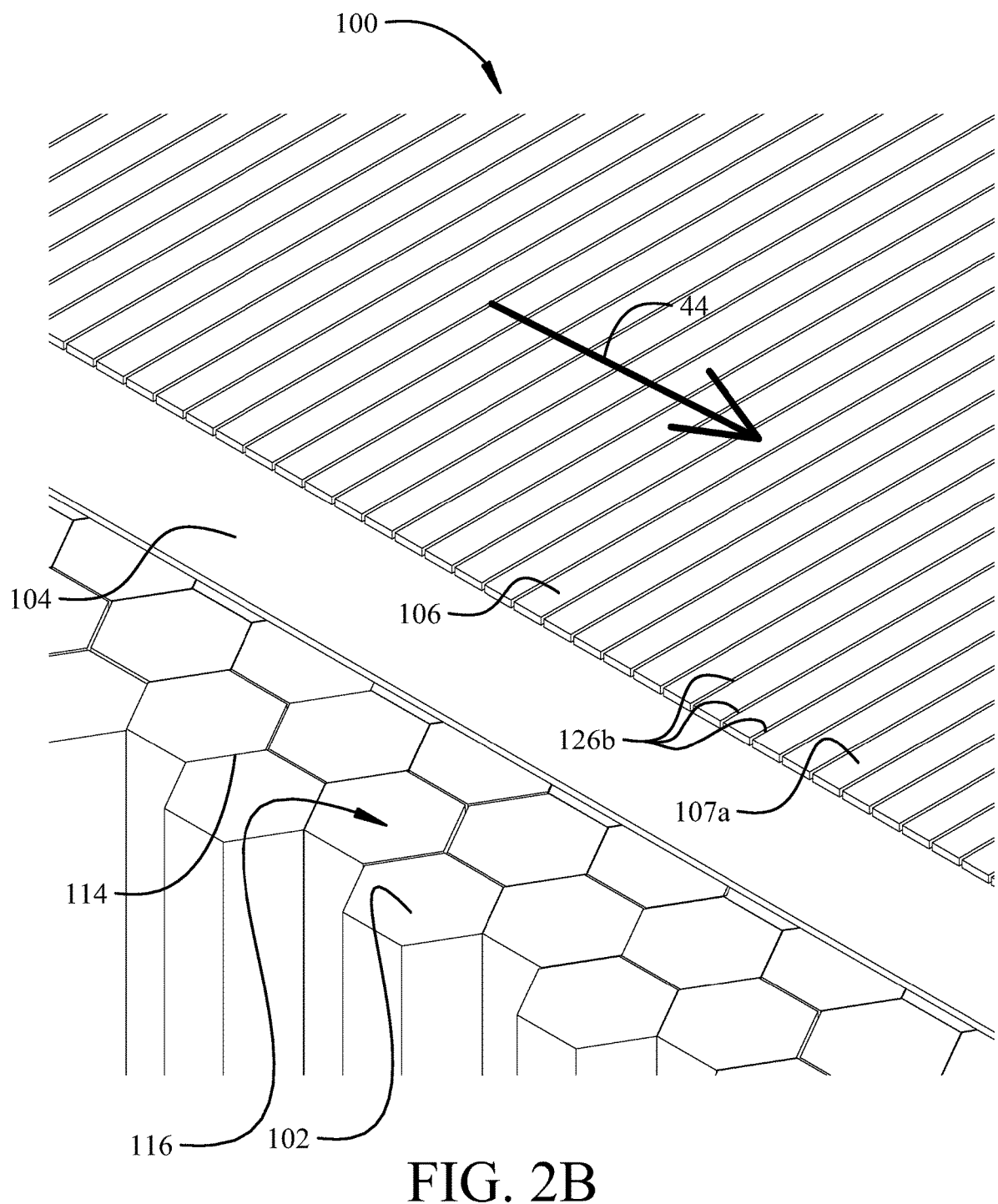
FIG. 2B is an exploded perspective view of a second implementation of the exemplary liner assembly that may be used with the engine housing shown in FIG. 1B and FIG. 1C.
Figure 2C:
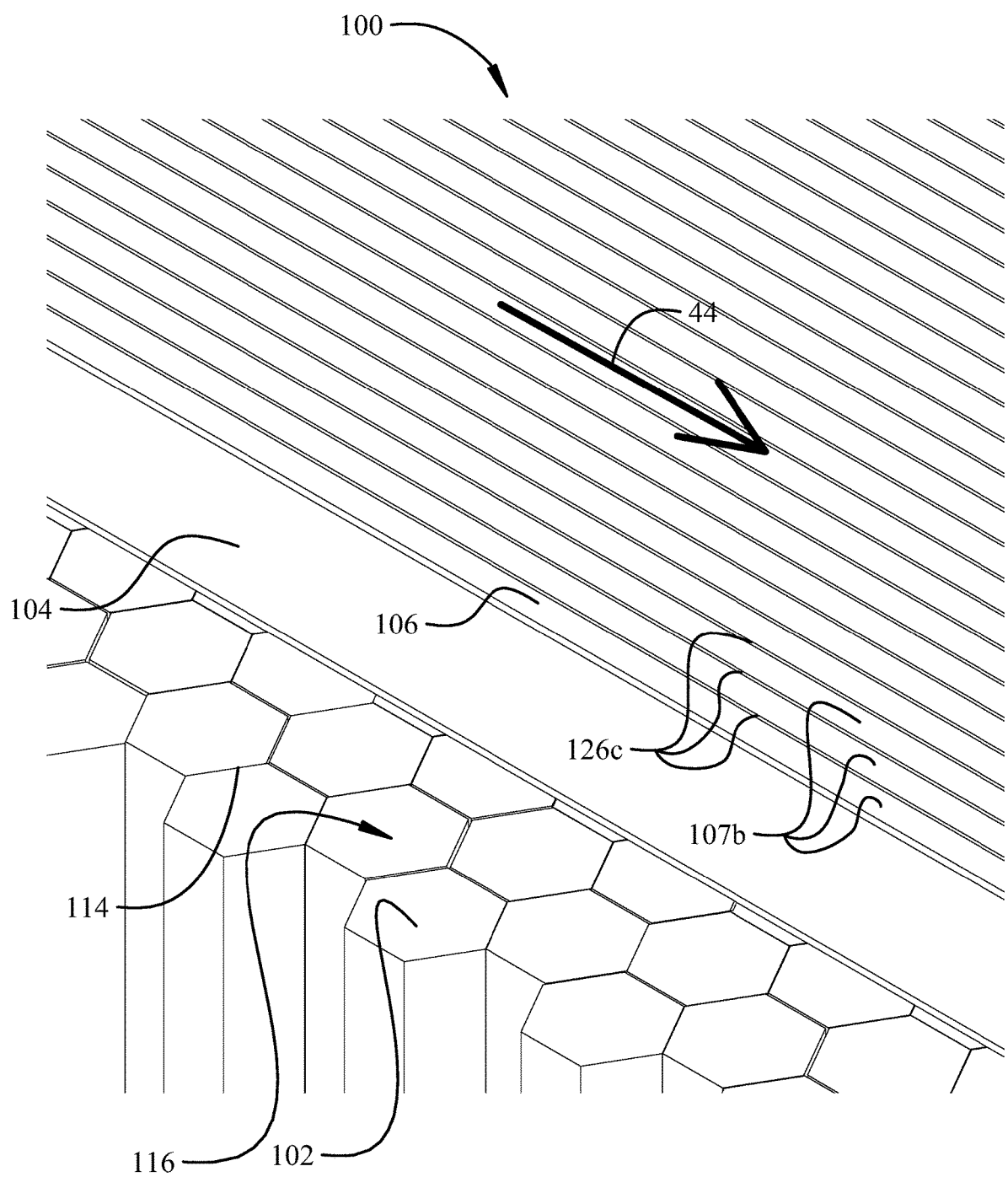
FIG. 2C is an exploded perspective view of a third implementation of the exemplary liner assembly that may be used with the engine housing shown in FIG. 1D and FIG. 1E.
Figure 3:
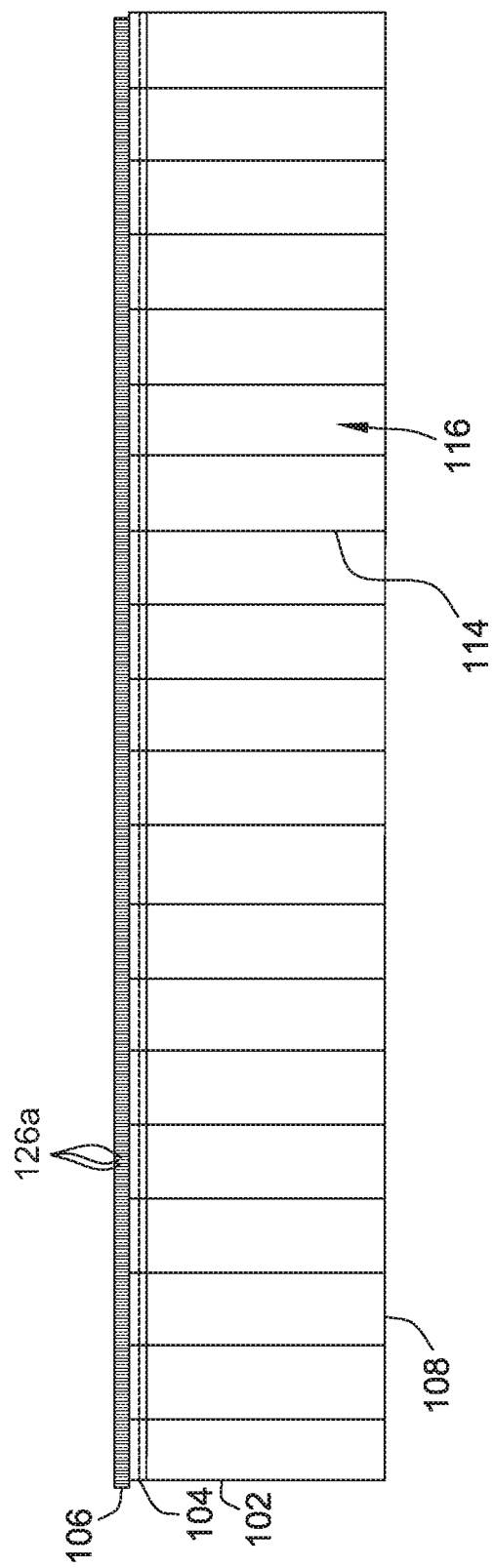
FIG. 3 is a cross-sectional view of the liner assembly shown for the implementation of FIG. 2A but applicable to the implementations of FIGS. 2B and 2C.
Figure 4:
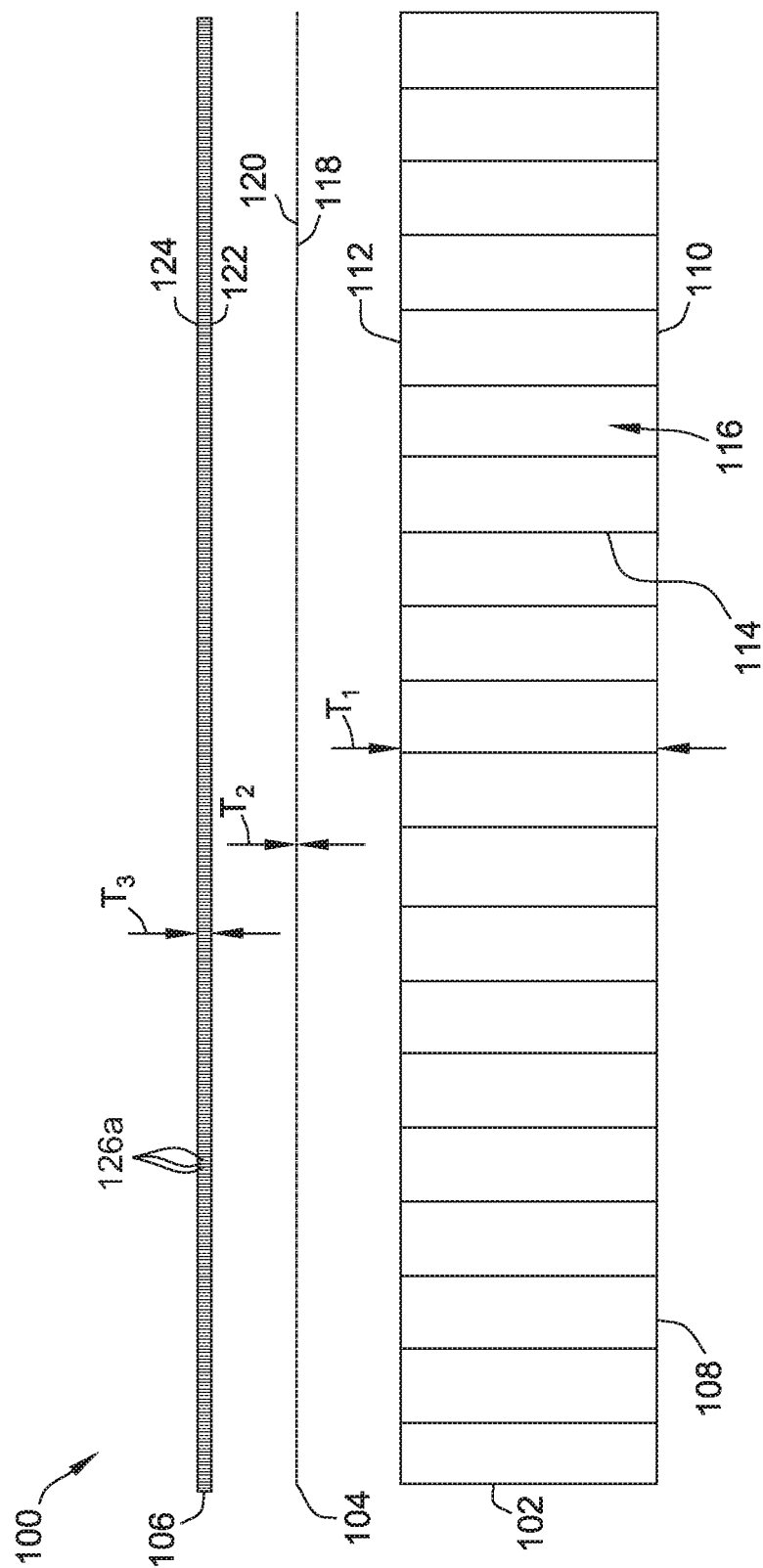
FIG. 4 is an exploded side view of the liner assembly shown for the implementation of FIG. 2A but applicable to the implementations of FIGS. 2B and 2C illustrating an exemplary facesheet, a septum, and a core.

FIGS. 2A, 2B, and 2C are exploded perspective views of three exemplary implementations of liner assembly 100 that may be used with engine housing 12 (shown in FIG. 1A). FIG. 3 is a cross-sectional view of liner assembly 100 shown for the implementation of FIG. 2A but applicable to the implementations of FIGS. 2B and 2C. FIG. 4 is an exploded cross sectional view of liner assembly 100 shown for the implementation of FIG. 2A but applicable to the implementations of FIGS. 2B and 2C, and FIGS. 5A, 5B, and 5C are top views of liner assembly 100 for the implementations shown in FIGS. 2A, 2B, and 2C, respectively.

Liner assembly 100 includes a core 102, a septum 104, and a facesheet 106 coupled to one another. Core 102 is coupled to at least one of inner surface 24 (shown in FIG. 1A) and outer surface 38 (shown in FIG. 1A), and facesheet 106 is exposed to airflows 44 and 45 when engine assembly 10 (shown in FIG. 1A) is in an operational state. Liner assembly 100 also includes a backsheet 108 coupled to core 102 opposite facesheet 106. Backsheet 108 provides a cap to the individual cells of core 102 to facilitate noise attenuation. Backsheet 108, core 102, septum 104, and facesheet 106 are coupled together using diffusion bonding. Backsheet 108, core 102, septum 104, and facesheet 106 may be brazed or welded together, or in another implementation, may be coupled together using an adhesive. Generally, backsheet 108, core 102, septum 104, and facesheet 106 may be coupled together in any suitable fashion that enables liner assembly 100 to function as described herein.

As shown in FIGS. 2A-2C, 3, 4, and 5A-5C, core 102 includes a first surface 110 and an opposing second surface 112 having cell openings defined therethrough. First surface 110 is coupled to backsheet 108 and second surface 112 is coupled to septum 104. In one implementation, backsheet 108 closes first surface 110 such that first surface 110 is impermeable to air and, therefore, acoustic flow.

Furthermore, core 102 includes a plurality of cells 114 extending between surfaces 110 and 112 and arranged in a honeycomb pattern wherein each cell 114 has a generally hexagonal cross-section and includes a channel 116 defined therethrough. Generally, cells 114 may be shaped and arranged in any suitable pattern that enables core 102 to function as described herein. In the exemplary implementation, core cells 114 are full-depth cells, that is, cells 114 are continuous through core 102 between surfaces 110 and 112.

In one implementation, core 102 includes a thickness T1 in a range of approximately 0.1 inches (in.) (2.54 millimeters (mm.)) to approximately 4.0 in. (101.6 mm.). Generally, core 102 may have any thickness that facilitates operation of liner assembly 100 as described herein. More specifically, the thickness T1 of core 102 may be tuned to provide optimum noise attenuation for various jet engine and nacelle configurations. More specifically, the thickness T1 of core 102 may be based on the location of liner assembly 100 within engine assembly 10. Additionally, core 102 is formed from fiberglass-reinforced phenolic resin. In alternative embodiments, core 102 is formed from another fiber-reinforced resin. In still other alternative embodiments, core 102 is formed from at least one of a plastic material, a metal, a coated paper material, or any other suitable material that enables core 102 to function as described herein.

In the exemplary implementation, septum 104 includes a first surface 118 and an opposing second surface 120. Septum first surface 118 is coupled to second surface 112 of core 102, and septum second surface 120 is coupled to facesheet 106. As such, septum 104 is coupled between core 102 and facesheet 106 such that core 102 does not contact facesheet 106 and septum 104 is directly coupled to facesheet 106. In another implementation is septum 104 covers only the open areas of facesheet 106 such that facesheet 106 is directly coupled to core 102. In the illustrated implementation, septum 104 is coupled to core 102 using an adhesive. In certain implementations, the adhesive is a reticulated film adhesive to facilitate avoiding interference with the acoustic coupling of cells 114 and septum 104. In other implementations, septum 104 is coupled to core 102 in any suitable fashion that enables liner assembly 100 to function as described herein.

Septum 104 is formed at least partially from a material that provides substantially linear acoustic attenuation. In certain implementations, septum 104 is formed from a woven fabric, such as a fabric woven from thermoplastic fibers in the polyaryletherketone (PAEK) family. In an implementation, septum 104 is formed from at least one of a polyetherketoneketone (PEKK) and a polyether ether ketone (PEEK) woven fabric. As used herein, the term "linear material" is meant to describe any material that responds substantially the same to acoustic waves regardless of the sound pressure (i.e., amplitude) of the waves, to facilitate noise attenuation. With a linear material, the pores or passages defined therein may be configured such that resistance to pressure waves does not vary with the noise level, and the pressure drop across the material is relatively constant with respect to the pressure wave velocity. This is a result of the pressure losses primarily due to viscous or friction losses through the material.

Additionally, in certain implementations, septum 104 has a thickness T2 in a range of about 0.001 inches (0.0254 mm.) to 0.200 inches (5.08 mm.). In another implementation, the thickness T2 is in a range of 0.003 inches (0.0762 mm.) to about 0.100 inches (2.54 mm.). In an embodiment, septum 104 has a thickness T2 of about 0.005 inches (0.127 mm.). In alternative implementations, septum 104 is formed from any suitable material and has any suitable thickness that enables septum 104 to function as described herein.

Figure 5A:
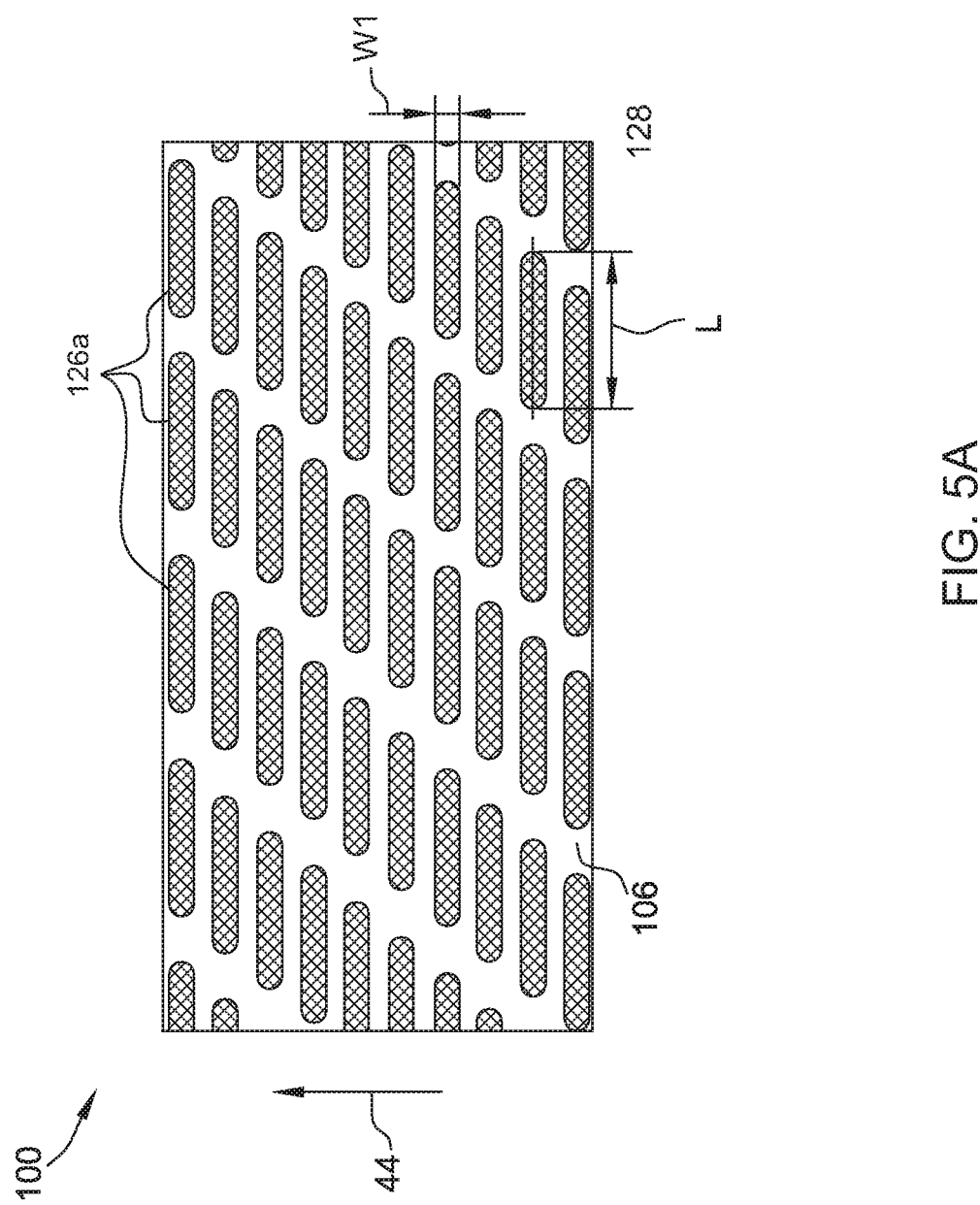
FIG. 5A is top view of the facesheet shown in FIG. 2A illustrating the plurality of slots defined therethrough.

Liner assembly 100 includes facesheet 106 including a first surface 122 and an opposing second surface 124. Facesheet first surface 122 is coupled to second surface 120 of septum 104, and facesheet second surface 124 is exposed to axially-oriented airflow 44. Facesheet 106 includes a plurality of slots 126a extending therethrough from first surface 122 to second surface 124. As best shown in FIGS. 2A and 5A for a first exemplary implementation, each slot 126a includes a major axis 128 (seen in FIG. 5A) that is oriented perpendicular to the direction of airflow 44. That is, each slot 126a is elongated such that each slot 126a defines a length L in a direction perpendicular to the direction of airflow 44 over facesheet 106. Alternatively, as best shown in FIG. 5C, each slot 126c includes an axis 129 oriented parallel to the direction of airflow 44.

In the exemplary implementation shown in FIGS. 2A and 5A, slots 126a include a length in a range of approximately 0.250 in. (6.35 mm.) to approximately 1.500 in. (38.1 mm.). As such, as liner assembly 100 extends circumferentially along inner surface 24 (shown in FIG. 1A) of nacelle 14 (shown in FIG. 1A) and/or outer surface 38 (shown in FIG. 1A) of core casing 16 (shown in FIG. 1A), slots 126 are oriented circumferentially with respect to centerline 18 (shown in FIG. 1A). In the exemplary implementation, each slot 126a also defines a width W1 extending in the direction of airflow 44. More specifically, each slot 126a defines a width of approximately 0.005 inches (0.127 mm.) to approximately 0.06 inches (1.524 mm.). In another implementation, the width W1 of each slot 126a is a maximum of 0.06 inches (1.524 mm.). In alternative implementations, length L and width W1 will have dimensions that scale with application and flow conditions.

Figure 5B:
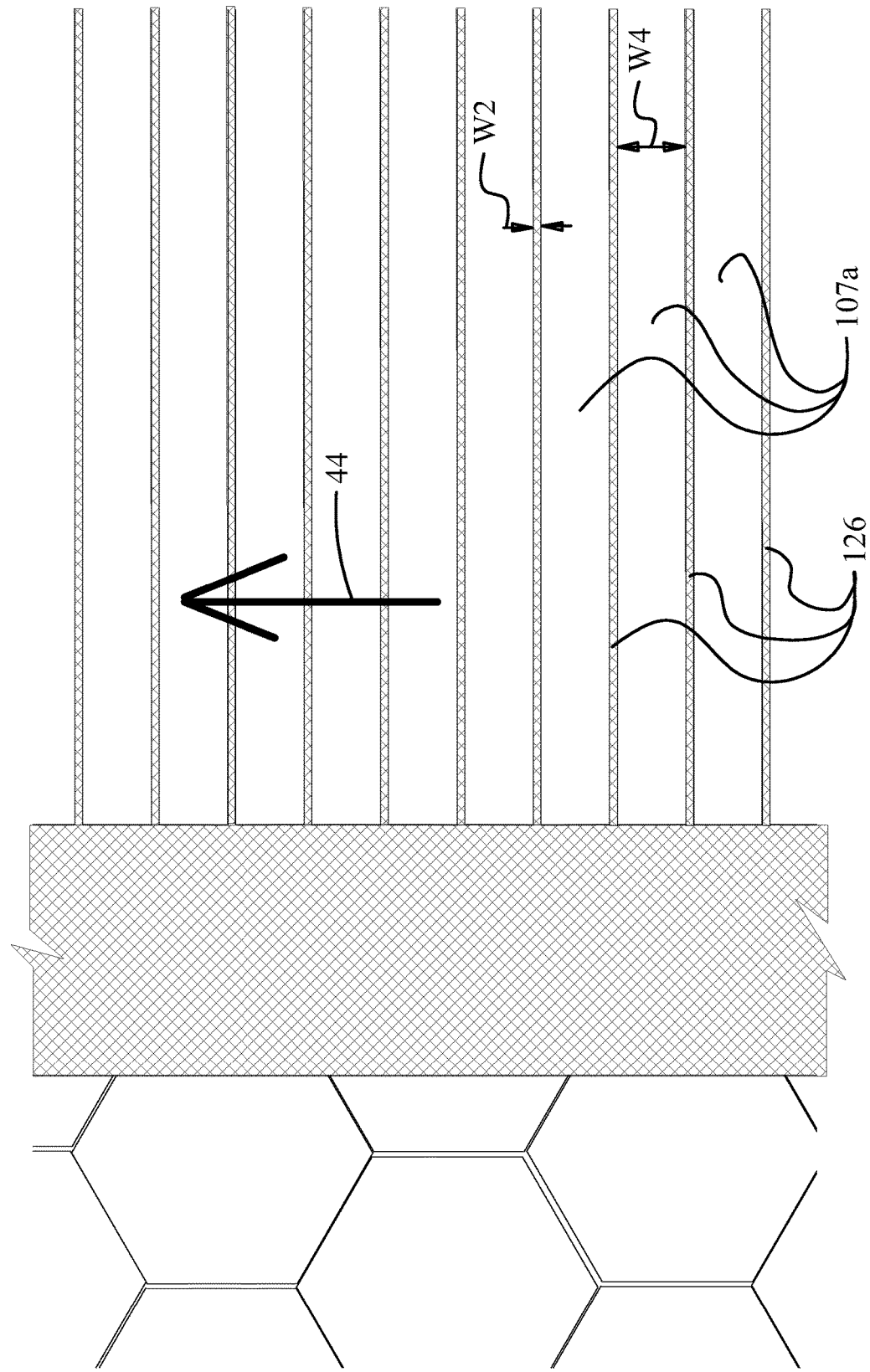
FIG. 5B is top view of the facesheet shown in FIG. 2B illustrating the plurality of slots defined therethrough.

In the exemplary implementation shown in FIGS. 2B and 5B, slots 126b are oriented circumferentially with respect to centerline 18 (shown in FIGS. 1A, 1B, and 1C) and are substantially circumferentially continuous as liner assembly 100 extends circumferentially along inner surface 24 (shown in FIG. 1A) of nacelle 14 (shown in FIG. 1A) and/or outer surface 38 (shown in FIG. 1A) of core casing 16 (shown in FIG. 1A). In this exemplary implementation, each slot 126b defines a width W2. More specifically, each slot 126b defines a width W2 of approximately 0.005 inches (0.127 mm.) to approximately 0.06 inches (1.524 mm.). In another implementation, the width W2 of each slot 126b is a maximum of 0.06 inches (1.524 mm.). Each strip 107a intermediate the slots 126b in the face sheet 106 define a width W4 of 0.05 inches to 0.50 inches (1.27 mm to 12.7 mm). In alternative implementations, widths W2 and W4 will have dimensions that scale with application and flow conditions. The substantially continuous nature of the slots 126b creates a high aspect ratio of both the slots 126b and the strips 107a.

Figure 5C:
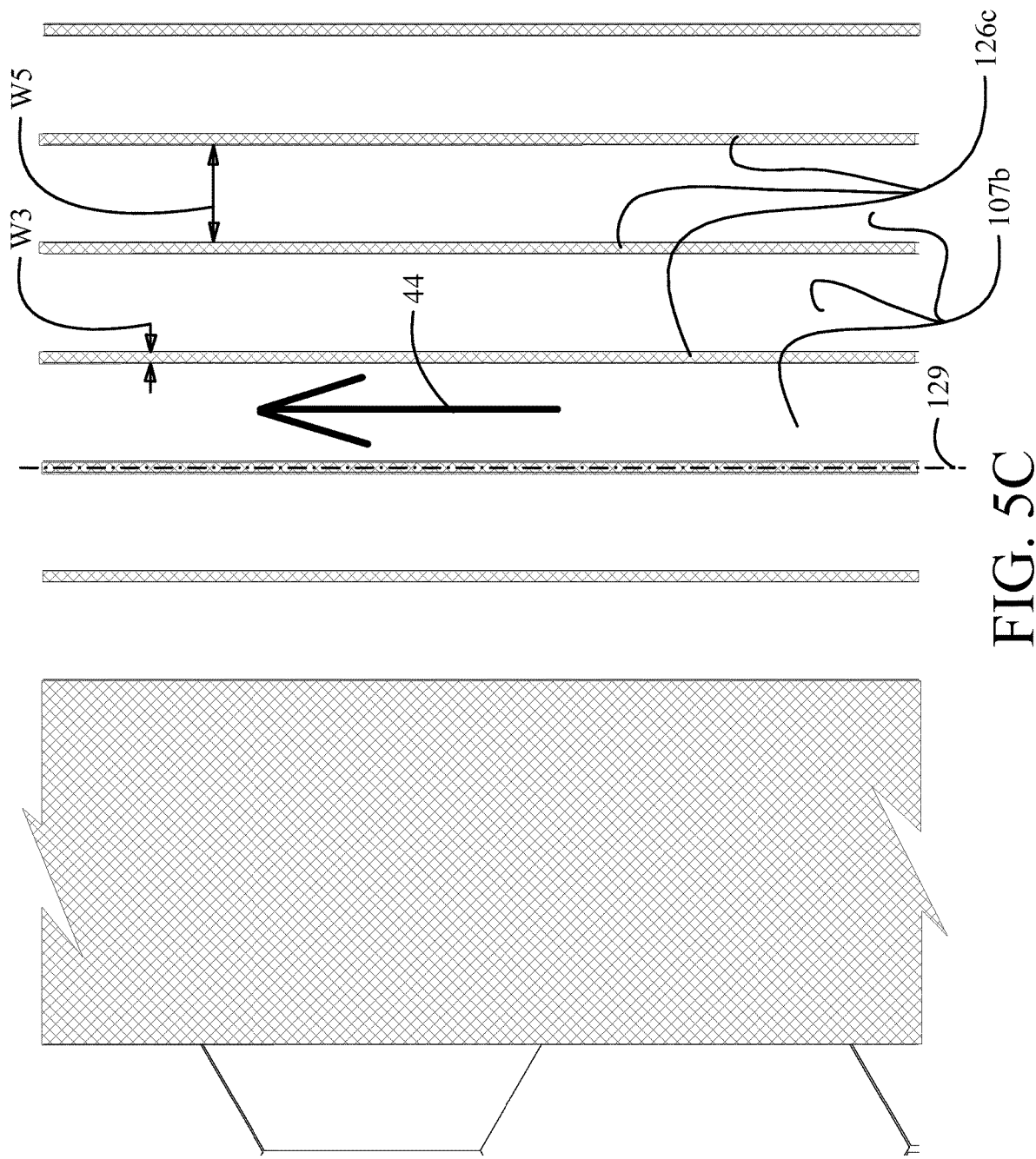
FIG. 5C is top view of the facesheet shown in FIG. 2C illustrating the plurality of slots defined therethrough.

In the exemplary implementation shown in FIGS. 2C and 5C, slots 126c slots 126c are oriented parallel to centerline 18 (shown in FIG. 1A). In the exemplary implementation, each slot 126c defines a width W3. More specifically, each slot 126c defines a width W3 of approximately 0.005 inches to 0.10 inches (0.127 mm. to 2.54 mm.) wide. Each strip 107b intermediate the slots 126c in the face sheet 106 define a width W5 of 0.05 inches to 0.50 inches (1.27 mm. to 12.7 mm.). In alternative implementations widths W3 and W5 will have dimensions that scale with application and flow conditions.

As shown in FIG. 5A, slots 126a are elongated in a direction perpendicular to centerline 18 and, thus, the direction of airflow 44. Such a perpendicular orientation facilitates minimizing drag created by slots 126a for a certain open area. More specifically, experimental testing has shown that orienting slots 126a in a direction perpendicular to the direction of airflow 44 can reduce drag. Furthermore, combining the perpendicular orientation of slots 126a with the position of septum 104 being directly adjacent facesheet 106 can further reduce the drag to levels below that as would be expected according to estimates. Such experimental drag levels are comparable to that of a facesheet having no slots. Tests have shown that the smaller the width W1 of slots 126a oriented a direction perpendicular to centerline 18 (and the direction of airflow 44), the lower the measured drag levels.

In one implementation, slots 126a are spaced on facesheet 106 such that facesheet 106 has a porosity in a range of between approximately 5 percent open area (POA) to approximately 40 POA, and more specifically, between approximately 15 POA to approximately 30 POA. In the exemplary implementation, slots 126a are spaced such that facesheet 106 has a porosity of approximately 20 POA. The relatively high porosity of facesheet 106 reduces the pressure loss through slots 126a. Accordingly, the pressure within core 102 is approximately equal to the pressure along second surface 124 of facesheet 106, and slots 126a do not significantly affect the flow of air into and out of core 102 as sound waves pass over surface of facesheet 106. In some implementations, the percent open area of facesheet 106 is based on a percent open area of septum 104 such that facesheet 106 and septum 104 generate a predetermined combined flow resistance. For example, in implementations where septum 104 has a low percentage open area, facesheet 106 will have a high percent open area such that the combined flow resistance of facesheet 106 and septum 104 is within a predetermined range. Moreover, in the illustrated embodiment, slots 126a are disposed in a staggered pattern such that they alternate in axial position along a circumference of facesheet 106. In alternative implementations, slots 126a may be disposed in any suitable pattern that enables facesheet 106 to function as described herein. For example, the slots 126a may be disposed in a non-staggered pattern.

Facesheet 106 is made of a metallic material, such as, but not limited to, titanium, aluminum, or any other metallic material. Additionally, in another implementation, facesheet 106 is made of composite, resin, wood, or any material that holds stress and facilitates operation of liner assembly 100 as described herein. Furthermore, facesheet 106 includes a thickness T3 in a range of between approximately 0.01 inches (0.254 mm.) to 0.25 inches (6.35 mm.) and, in certain implementations, in a range of between 0.05 inches (1.27 mm.) and approximately 0.1 inches (2.54 mm.). Generally, facesheet 106 may have any thickness T3 that facilitates operation of liner assembly 100 as described herein.

In at least some embodiments, a shape and spacing of slots 126a on facesheet 106 facilitate an increased linearity of, and acoustic attenuation by, liner assembly 100, as compared to at least some known perforated facesheets. Additionally, alignment of slots 126a perpendicular to centerline 18 (and the direction of airflow 44) facilitates minimizing drag created by slots 126a. The shape and spacing of slots 126a also facilitates a decreased cost and time required to manufacture facesheet 106. For example, in a particular embodiment, facesheet 106 is used as part of nacelle 14 (shown in FIG. 1A) for a turbofan engine, and facesheet 106 includes about 96,000 slots 126a, wherein millions of perforations are required for a conventional facesheet in a similar application.

As shown in FIG. 5B, slots 126b are substantially circumferentially continuous and perpendicular to centerline 18 and, thus, the direction of airflow 44. Such a perpendicular orientation facilitates minimizing drag created by slots 126b for a certain open area. More specifically, orienting slots 126b in a direction perpendicular to the direction of airflow 44 can reduce drag. Furthermore, combining the perpendicular orientation of slots 126b with the position of septum 104 being directly adjacent facesheet 106 can further reduce the drag to levels below that as would be expected according to estimates. The substantially continuous slots 126b result in strips 107a in the facesheet 106. The strips 107a may be separately formed and adhered to the septum 104 forming the slots 126b or a continuous facesheet 106 may be adhered to the septum 104 and slot 126b formed by machining, chemical etching, or other means. The strips 107a may be formed in patches or sections in a matrix over the desired liner assembly 100.

As shown in FIG. 5C, slots 126c are substantially continuous over a portion of the surface selected for coverage by the liner 100, i.e., a portion or all of inner surface 24 of nacelle 14, outer surface 38 of core casing 16, and/or outer surface 42 of nozzle portion 40. The slots 126c are parallel to centerline 18 and, thus, parallel to the direction of airflow 44. The portion of the surface 24, 38, and/or 42 selected for coverage may comprise a field specifically having longitudinal flow, i.e., flow parallel to the centerline 18. Such a parallel orientation of the slots 126c to the airflow 44 facilitates minimizing drag created by slots 126c for a certain open area. More specifically, orienting slots 126c in a direction parallel to the direction of airflow 44 can reduce drag. Furthermore, combining the parallel orientation of slots 126c with the position of septum 104 being directly adjacent facesheet 106 can further reduce the drag to levels below that as would be expected according to estimates. The substantially continuous slots 126c result in strips 107b in the facesheet 106. The strips 107b may be separately formed and adhered to the septum 104 forming the slots 126c or a continuous facesheet 106 may be adhered to the septum 104 and slot 126c formed by machining, chemical etching, or other means. The strips 107b may be formed in patches or sections in a matrix over the desired liner assembly 100.

In each of the exemplary implementations described, as shown for example in FIGS. 1C and 1E, the plurality of slots 126a, 126b or 126c provide an array 130 of slots and intervening strips 107a, 107b in the liner 100 wherein each slot 126a, 126b or 126c is parallel to adjacent slots on either side with the array 130 extending over the portion of the surface selected for coverage by the liner 100. In the implementations described with respect to FIGS. 2A, 2B and 5A, 5B the slots 126a, 126b in the array 130 are oriented perpendicular to the airflow 44 and extend circumferentially around surface covered by the liner 100. In the implementations described with respect to FIGS. 2C and 5C the slots 126c in the array 130 are parallel to the airflow 44 and extend along the liner 100 parallel to the airflow 44.

Figure 6:
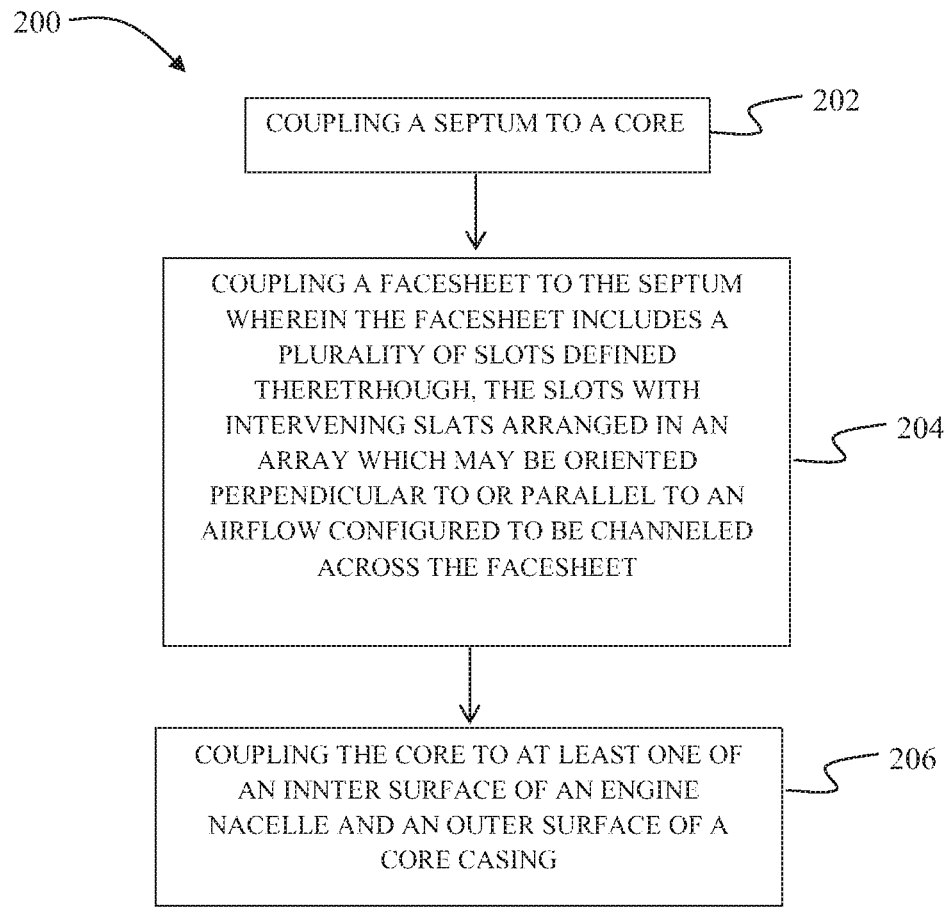
FIG. 6 is a flowchart of an embodiment of a method of assembling the liner assembly shown in FIGS. 2A-2C.

FIG. 6 is a flowchart of an embodiment of a method 200 of assembling a liner assembly, such as liner assembly 100. Method 200 includes coupling 202 a septum, such as septum 104, to a core, such as core 102, and then coupling 204 a facesheet, such as facesheet 106, to the septum. The facesheet includes a plurality of slots, such as slots 126a, 126b, or 126c, defined therethrough, the slots with intervening slats, such as slats 107a or 107b, arranged in an array 130. The array 130 may be oriented perpendicular to or parallel to a centerline, such as centerline 18, and thus perpendicular or parallel to an airflow, such as airflow 44, configured to be channeled across the facesheet. Coupling the factsheet 106 to the septum 104 may include adhering individual strips 107a, 107b intermediate the slots 126b, 126c to the septum 104 or coupling the facesheet 106 to the septum 104 and machining, chemical etching, or otherwise forming the slots 126b, 126c in the facesheet 106. Method 200 further includes coupling 206 the core to at least one of an inner surface of an engine nacelle, such as inner surface 24 of nacelle 14, and an outer surface of a core casing, such as outer surface 38 of core casing 16.

Each of the processes of method 200 may be performed or carried out by a system integrator, a third party, and/or a customer. For the purposes of this description, a system integrator may include without limitation any number of aircraft manufacturers and major-system subcontractors; a third party may include without limitation any number of venders, subcontractors, and suppliers; and a customer may be an airline, leasing company, military entity, service organization, and so on. Moreover, although an aerospace example is shown, the principles of the invention may be applied to other industries, such as the automotive industry.

The implementations described herein provide an apparatus and method for noise attenuation and drag reduction in an engine housing. The embodiments describe a liner assembly that includes a core, a septum coupled to the core, and a facesheet coupled to the septum. The facesheet includes a plurality of slots defined therethrough. Each slot is continuous in a direction perpendicular or parallel to the direction of an airflow that is configured to travel over the facesheet. Furthermore, the septum is coupled to a top surface of the core such that the facesheet and the core do not contact one another. The embodiments described herein provide improvements over at least some known noise attenuation systems for engine housings. As compared to at least some known noise attenuation systems, the embodiments described herein facilitate reducing the drag induced by the slots during operation. More specifically, as described above, experimental testing has shown that orienting the continuous slots in a direction perpendicular or parallel to the airflow direction reduces drag. Furthermore, combining the perpendicular or parallel orientation of the continuous slots with the position of the septum being directly adjacent the facesheet further reduces the drag to unexpected levels comparable to that of a facesheet having no slots.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A liner assembly comprising:
   a core;
   a septum coupled to said core; and
   a facesheet coupled to said septum, said facesheet comprising an array having a plurality of slots defined therethrough with intervening strips, said slots parallel to adjacent slots in the array with the intervening strips extending between the slots, wherein the slots and intervening strips are continuous over a selected surface covered by the liner assembly.

2. The liner assembly in accordance with claim 1, wherein the slots and intervening strips in the array are oriented perpendicular to an airflow over the face sheet.

3. The liner assembly in accordance with claim 1, wherein said plurality of slots define a width of between 0.005 inches and 0.06 inches.

4. The liner assembly in accordance with claim 1, wherein said plurality of slots include a maximum width of 0.06 inches.

5. The liner assembly in accordance with claim 1, wherein the intervening strips have a width of 0.05 inches to 0.50 inches.

6. The liner assembly in accordance with claim 1, wherein said facesheet has a porosity in a range of between 5 percent and 40 percent open area.

7. An engine housing having a centerline and an axis extending through the engine housing parallel to the centerline, said engine housing comprising:
   a nacelle comprising an inner surface;
   a core casing comprising an outer surface, wherein said inner surface and said out surface are configured to be exposed to an airflow traveling in a direction generally parallel to the axis; and
   a liner assembly coupled to at least one of said inner surface and said outer surface, said liner assembly comprising:
      a core;
      a septum coupled to said core; and
      a facesheet coupled to said septum, said facesheet comprising an array having a plurality of parallel slots defined therethrough with intervening strips extending between the parallel slots, wherein the slots are continuous over the inner surface covered by the liner assembly.

8. The engine housing in accordance with claim 7, wherein said plurality of slots and intervening strips are oriented circumferentially with respect to the centerline.

9. The aircraft engine housing in accordance with claim 7, wherein said facesheet is coupled to only a portion of at least one of said inner surface and said outer surface.

10. The aircraft engine housing in accordance with claim 7, wherein said plurality of slots include a maximum width of 0.06 inches.

11. The aircraft engine housing in accordance with claim 7, wherein said septum is coupled between said core and said facesheet.

12. The aircraft engine housing in accordance with claim 7, wherein said facesheet has a porosity in a range of between 5 percent to 40 percent open area.

13. A method of assembling a liner assembly, said method comprising:
    coupling a septum to a core; and
    coupling a facesheet to the septum, wherein the facesheet comprises an array having a plurality of slots defined therethrough with intervening strips, said slots is parallel to adjacent slots in the array with the intervening strips extending between the slots, wherein the slots and intervening strips are continuous over a selected surface covered by the liner assembly.

14. The method in accordance with claim 13, further comprising coupling the core to an inner surface of an engine nacelle.

15. The method in accordance with claim 14, wherein coupling the core to the inner surface comprises coupling the facesheet including the array with the plurality of slots perpendicular to the centerline with each slot having a width between 0.005 inches and 0.06 inches.

16. The method in accordance with claim 14, wherein coupling the core to the inner surface comprises coupling the facesheet including the plurality of slots parallel to the airflow with each slot having a width between 0.005 inches and 0.10 inches.

* * * * *